United States Patent [19]

Book

[11] Patent Number: 5,190,376

[45] Date of Patent: Mar. 2, 1993

[54] COLLAPSIBLE, PORTABLE, MULTIPLE USE, INSULATED BAG WITH COMPANION ATTACHABLE MULTIPLE USE BAG

[75] Inventor: Steven C. Book, North Hollywood, Calif.

[73] Assignee: Auto-Shade, Inc., North Hollywood, Calif.

[21] Appl. No.: 757,077

[22] Filed: Sep. 10, 1991

[51] Int. Cl.⁵ .............................................. B05D 30/08
[52] U.S. Cl. .......................................... 383/4; 383/86; 383/110; 206/545; 206/547; 206/549
[58] Field of Search ..................... 383/2, 4, 110, 120, 383/86, 25, 29, 100; 206/545, 546, 548, 549

[56]  References Cited
U.S. PATENT DOCUMENTS

| | | | |
|---|---|---|---|
| 3,085,612 | 4/1963 | Gobel | 383/110 |
| 4,211,091 | 7/1980 | Campbell | 383/110 |
| 4,228,908 | 10/1980 | Tweeton | 206/545 |
| 4,533,050 | 8/1985 | Bake, Jr. | 206/545 |
| 4,537,313 | 8/1985 | Workman | 383/110 |
| 4,578,814 | 3/1986 | Skamser | 383/110 |
| 4,648,121 | 3/1987 | Lowe | 383/86 |
| 4,679,242 | 7/1987 | Brockhaus | 383/4 |
| 4,744,446 | 5/1988 | Arney | 383/37 |
| 4,805,776 | 2/1989 | Namgyal et al. | 383/110 |
| 4,932,576 | 6/1990 | Ashley | 383/33 |
| 4,995,436 | 2/1991 | Cantor | 383/37 |
| 5,005,679 | 4/1991 | Hjelle | 383/110 |

Primary Examiner—Allan N. Shoap
Assistant Examiner—Christopher McDonald
Attorney, Agent, or Firm—Blakely, Sokoloff, Taylor & Zafman

[57]  ABSTRACT

An improved portable cooler that is a collapsible, portable, multiple use insulated bag with a companion detachable multiple use bag for use in transporting and storing items especially those items commonly used while driving an automobile. The bag may be used to carry cassettes which are then insulated from outside heat as well as beverage containers such as in aluminum cans that are thus maintained at a cooler temperature. The bag is especially convenient for placing on the center console of automobiles that have such space on the floor.

13 Claims, 1 Drawing Sheet

COLLAPSIBLE, PORTABLE, MULTIPLE USE, INSULATED BAG WITH COMPANION ATTACHABLE MULTIPLE USE BAG

FIELD OF THE INVENTION

The invention relates to insulated transportable cooler bags.

DESCRIPTION OF RELATED ART

The invention is in the field of transportable cooler bags which are generally either stiff rectangular shapes or soft shapes. Such carriers are cumbersome to handle and do not provide sufficient flexibility.

Prior art cooler bags do not have the features such as an attachable companion bag, are not easily folded for storage and do not have necessary straps and other devices to serve as multiple use cooler bags.

SUMMARY OF THE INVENTION

The instant invention provides a convenient transportable storage bag having a main compartment and a detachable can holder for two cans. The bag is provided with insulation to assure that items stored within the compartments and can holder are kept as long as possible at the desired temperature. An advantage of the insulated bag is that it can be used to protect items such as cassettes, compact discs, makeup, food, beverages and candy from extreme heat or cold.

The insulated bag can also be conveniently folded to a flat pack for storage. When expanded it can be used as a support for writing. The detachable can holder can be attached to other convenient surfaces.

The invention is especially suited for use in an automobile on the console, on the seat next to the driver or it can serve as a console between seats.

In accordance with the description presented herein other objects of the invention will become apparent when the drawings and specifications herein are reviewed.

DESCRIPTION OF PREFERRED EMBODIMENT

Figure 1:
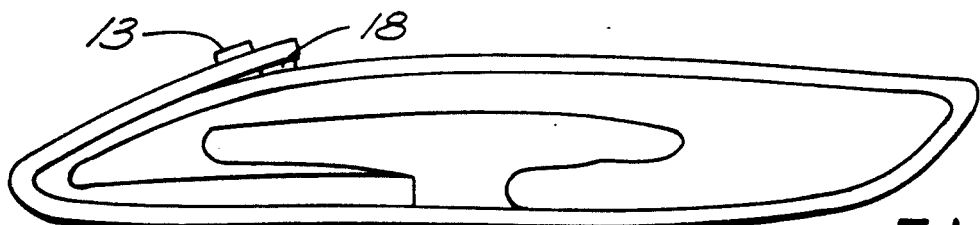
FIG. 1 is a side view of the cooler bag combination folded for storage.
Figure 2:
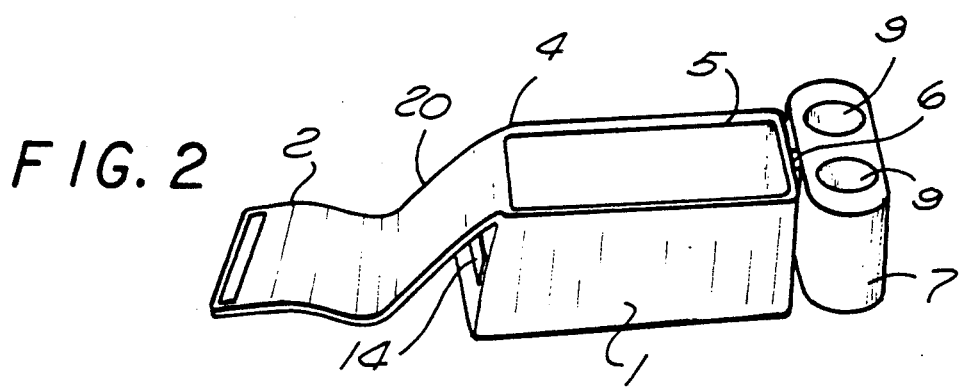
FIG. 2 is a perspective view of the cooler bag of FIG. 1 with the top cover open and detachable companion bag attached.
Figure 3:
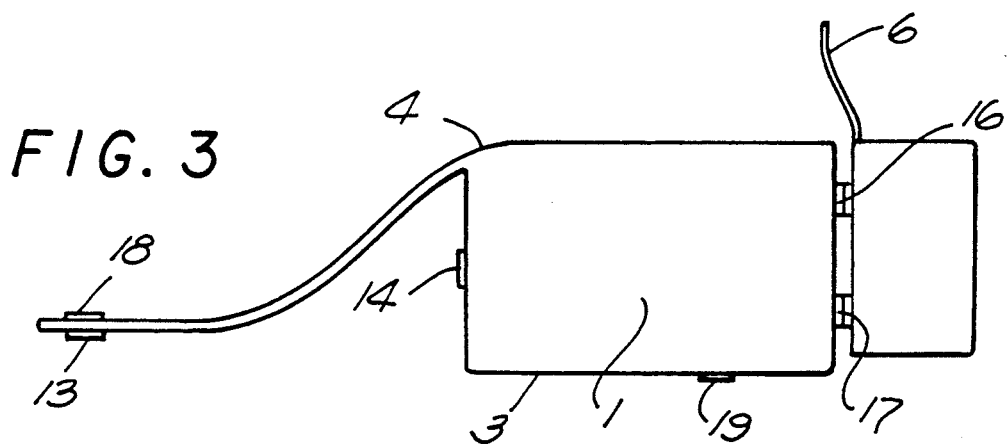
FIG. 3 is a side view of the cooler bag with the top cover open and detachable companion bag attached.

Referring to FIGS. 1 through 3, the collapsible, portable, multiple use insulated bag with companion detachable insulated bag is shown both in the collapsed state and the expanded for use states.

When collapsed the detachable bag (7) may be conveniently stored inside the main storage compartment (1). The sides (5) of the main storage compartment (1) are flexible to allow the unit to easily collapse and fold flat, but are resilient enough to keep the bag upright when placed in the open position. The main storage compartment (1) is of sufficient size to assure convenient storage of desired objects. The main storage compartment (1) is wide enough to assure stability when placed on a surface such as an automobile console. The flexible sides and bottom may be shaped to the available surface or space to provide additional stability. The height may be variable, but dimensions between several inches to eight inches have been found to be satisfactory. The preferred embodiment is of a height to allow audio compact discs to be stored upright.

The sides (5) and bottom (3) of the main storage compartment (1) are all fixed. The top cover (2) is attached at one end by a hinge (4) and folds over the storage compartment (1). An outer peripheral zipper (20) provides a seal to tightly close the unit to serve as an insulated storage container when desired and when being used as a carrier bag. In other configurations a flap of material used in conjunction with the zipper provides even greater thermal insulation.

A carry handle strap (14) of sufficient size and strength to allow easy carrying of the filled main storage compartment (1) is provided attached at one end of the main storage compartment (1). An additional carry handle strap may be added to allow the assembly to be carried horizontally. When carried horizontally the interior lining (33) prevents leakage as all edges at the bottom are permanently sealed. Other embodiments may have a means to attach the main storage compartment (1) to a belt that may be worn by the user when away from the automobile.

As part of the top cover (2), a cover attachment means (18) comprising a strip of one side of hook and loop material is provided to attach to a mating strip (19) on the bottom of the main storage compartment (1) when the assembly is collapsed flat. The matching strip (19) is made of sufficiently large and firm material to allow the assembly to be held firmly in place when placed on the carpet if the user wishes to place it on the floor of a carpeted automobile.

Figure 4:
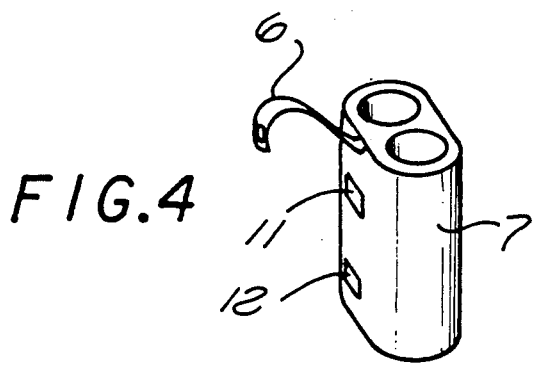
FIG. 4 is a perspective view of the detachable companion bag not attached.

Referring to FIGS. 2 through 4, the multiple use detachable bag (7) is attached at the end opposite the hinged end of the top cover (2) and any number of interior compartments may be formed. In the preferred embodiment the companion detachable bag (7) is attached by a plurality of attachment strips made of hook and loop material. The companion upper and lower detachable bag strips (11,12) of hook and loop material attach to the corresponding upper and lower rectangular bag companion detachable bag attachment strips (16,17). The detachable bag (7) may be of any convenient size that is sufficient to store the desired material. When the detachable bag (7) is attached to the storage compartment (1) the combination provides increased stability.

A hang strap (6) is attached to the detachable bag (7) to attach the detachable bag (7) to any surface that has a mating attachment means. For use in an automobile, a hole is provided on the hang strap (6) to attach the detachable bag to a door lock latch or convenient knob. A suction cup that attaches to any flat surface with an attachment means to attach to the hang strap (6) is also available. In the preferred embodiment, two twelve ounce beverage storage can spaces (9) are provided in the detachable bag (7) shown, but the detachable bag (7) may be used to store anything.

Figure 5:
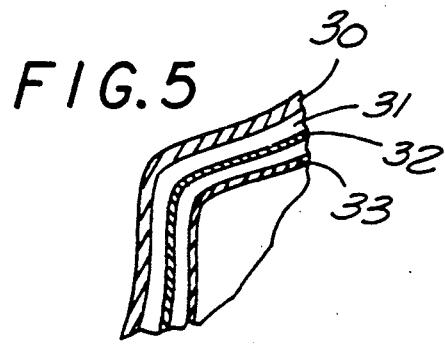
FIG. 5 is a perspective view of a cross section of the sides and bottom of the walls.

Referring to FIG. 5 a cross section of the sides (5) of the invention are shown. The outside material (30) is heavy duty casing material. An interior lining (33) of easily cleaned water proof material lines the inside to prevent leakage outside the compartments and to allow easy cleaning. Poly vinyl chloride has been suitable material for the interior lining (33). Sandwiched between the interior lining (33) and outside material (30) is a reflective barrier (32) and insulating foam (31). Poly ethylene has been found satisfactory for use as insulating foam (31). In combination the materials are both flexible to allow folding and sufficiently rigid to hold their shape once positioned. The insulation effect protects stored items from the effects of outside temperature.

Also in the preferred embodiment, a note pad holding strap (13) is provided on the outside of the top cover (2). Part of a note pad, usually the firm backing of the pad, may be slipped under the note pad holding strap (13) on the top cover (2) to provide a firm support on which to press while writing. The top cover (2) is comprised of two stiffened material sections to allow the top cover (2) to bend easily near the center when collapsing the detachable bag (7) yet remain firm as a writing surface when expanded. The note pad holding strap (13) may be of elastic material. On an alternative embodiment a loop to hold a pencil or pen is also provided.

I claim:

1. A storage bag that can be attached to an external mounting surface, comprising:
   a flexible bag having a first wall, a second wall, a third wall, a fourth wall and a bottom wall, said walls defining a cavity;
   a top cover pivotally attached to said first wall such that said top cover can be placed over said cavity;
   first cover attachment means operatively connected to said flexible bag and said top cover for attaching said top cover to said second, third and fourth walls such that said cavity is enclosed;
   first attachment strip means attached to said bottom wall for attaching said flexible bag to the external mounting surface; and,
   second attachment strip means attached to said top cover for attaching said top cover to said first attachment strip means and said bottom wall when said flexible bag is in a collapsed position.

2. The storage bag as recited in claim 1, wherein said first cover attachment means is a zipper.

3. The storage bag as recited in claim 1, wherein said first and second attachment strip means is constructed from hook and loop material.

4. The storage bag as recited in claim 1, further comprising a companion bag, and first companion bag attachment means operatively connected to said flexible bag and said companion bag for attaching said companion bag to said flexible bag.

5. The storage bag as recited in claim 4, wherein said companion bag has a pair of cavities adapted to receive beverage containers.

6. The storage bag as recited in claim 4, further comprising second companion bag attachment means operatively connected to said companion bag for attaching said companion bag to an external member.

7. The storage bag as recited in claim 1, wherein said top cover has a stiffness that will provide a writing surface.

8. A storage bag, comprising:
   a flexible bag having a first wall, a second wall, a third wall, a fourth wall and a bottom wall, said walls defining a cavity;
   a top cover pivotally attached to said first wall such that said top cover can be placed over said cavity, said top cover having a stiffness that will provide a writing surface;
   note pad attachment means operatively connected to said top cover for allowing a note pad to be attached to said top cover;
   first cover attachment means operatively connected to said flexible bag and said top cover for attaching said top cover to said second, third and fourth walls such that said cavity is enclosed;
   second cover attachment means operative connected to said top cover and said bottom wall for attaching said top cover to said bottom wall when said flexible bag is in a collapsed position;
   a companion bag;
   first companion bag attachment means operatively connected to said flexible bag and said companion bag for attaching said companion bag to said flexible bag.

9. The storage bag as recited in claim 8, wherein said first cover attachment means is a zipper.

10. The storage bag as recited in claim 8, wherein said second cover attachment means is constructed from hook and loop material.

11. The storage bag as recited in claim 8, wherein said first companion bag attachment means is constructed from hook and loop material.

12. The storage bag as recited in claim 8, wherein said companion bag has a pair of cavities adapted to receive beverage containers.

13. The storage bag as recited in claim 8, further comprising second companion bag attachment means operatively connected to said companion bag for attaching said companion bag to an external member.

* * * * *